United States Patent [19] [11] Patent Number: 5,024,784
Eich et al. [45] Date of Patent: * Jun. 18, 1991

[54] DEVICE FOR REVERSIBLE OPTICAL DATA STORAGE USING POLYMERIC LIQUID CRYSTALS

[75] Inventors: Manfred Eich, Frankfurt am Main; Joachim Wendorff, Nauheim, both of Fed. Rep. of Germany

[73] Assignee: Rohm GmbH Chemische Fabrik, Fed. Rep. of Germany

[*] Notice: The portion of the term of this patent subsequent to Jun. 6, 2006 has been disclaimed.

[21] Appl. No.: 71,192

[22] Filed: Jul. 8, 1987

[30] Foreign Application Priority Data

Jul. 11, 1986 [DE] Fed. Rep. of Germany ....... 3623395

[51] Int. Cl.$^5$ .............................................. C09K 19/52
[52] U.S. Cl. ........................... 252/299.01; 252/299.1; 252/299.68; 428/1; 350/349; 350/350 R; 350/351; 350/350 S
[58] Field of Search ........... 252/299.01, 200.1, 299.68; 428/1; 350/349, 350 R, 350 S, 351

[56] References Cited

U.S. PATENT DOCUMENTS

| | | | |
|---|---|---|---|
| 3,329,648 | 7/1967 | Chopoorian et al. | 252/299.01 |
| 4,232,951 | 11/1980 | Aharoni et al. | 252/299.1 |
| 4,293,435 | 10/1981 | Portugall et al. | 252/299.01 |
| 4,617,371 | 10/1986 | Blumstein et al. | 252/299.01 |
| 4,624,872 | 11/1986 | Stuetz et al. | 428/1 |
| 4,631,328 | 12/1986 | Ringsdorf et al. | 252/299.01 |
| 4,657,694 | 4/1987 | Heeger et al. | 252/299.01 |
| 4,702,558 | 10/1987 | Coles et al. | 350/330 |
| 4,702,945 | 10/1987 | Etzbach et al. | 428/1 |
| 4,733,109 | 3/1988 | Palazzotto | 252/299.68 |
| 4,755,574 | 7/1988 | Choe | 252/299.1 |
| 4,837,745 | 6/1989 | Eich et al. | 350/330 |
| 4,855,078 | 8/1989 | Leslie | 252/299.1 X |
| 4,855,376 | 8/1989 | De Martino et al. | 252/299.01 X |
| 4,867,538 | 9/1989 | Yoon et al. | 350/350 R |
| 4,868,250 | 9/1989 | De Martino et al. | 252/299.01 X |
| 4,886,718 | 12/1989 | Eich et al. | 252/299.68 |
| 4,887,889 | 12/1989 | Leslie | 252/299.1 X |
| 4,894,263 | 1/1990 | Dubois et al. | 428/1 |
| 4,906,407 | 3/1990 | De Martino et al. | 350/350 R |

FOREIGN PATENT DOCUMENTS 62-172541 7/1987 Japan ............................. 252/299.01

OTHER PUBLICATIONS

*The Physics and Chemistry of Liquid Crystal Devices*, G. J. Sprokel, ed., Plenum Press, N.Y. 1979.
Meredith et al., Macromolecules, vol. 15, pp. 1385–1399 (1982).
*The Condensed Chemical Dictionary*, (1971), p. 483.
*Advanced Organic Chemistry*, 2nd Edition, "Part A: Structure and Mechanisms", pp. 604–608, Francis A. Carey et al.

Primary Examiner—John S. Maples
Assistant Examiner—Richard Treanor

[57] ABSTRACT

A device for reversible optical information storage with a polymeric liquid crystalline storage medium, with the storage medium consisting of a macroscopically oriented film of a liquid crystalline polymer that contains photochromic groups, and with the information being stored by local disorientation of the molecules induced by photoisomerization by means of a selectively acting light source.

16 Claims, 2 Drawing Sheets

DEVICE FOR REVERSIBLE OPTICAL DATA STORAGE USING POLYMERIC LIQUID CRYSTALS

BACKGROUND OF THE INVENTION

1. Field of the Invention

This invention concerns a device for reversible optical data storage using polymeric liquid crystals.

2. Discussion of Background

Between the solid crystalline phase and the liquid melt, called isotropic melts below, intermediate phases occur in certain substances that combine characteristics of both the ordered crystalline state and the disordered molten state in structural and dynamic respects. Thus, these phases are actually fluid but they have optical characteristics, for example, that are characteristic of most crystalline substances but also of partially crystalline substances: they are birefringent. For immediately obvious reasons, we speak of intermediate phases (mesophases) or of liquid crystalline phases. These intermediate phases can be obtained by a change of temperature—in this case we speak of thermotropic liquid crystals—or in solution by changes of concentration. Only thermotropic liquids will be considered below. To characterize the ranges of existence of these intermediate phases, the transition temperatures from the crystalline state into the liquid crystalline state and from the liquid crystalline state into that of the isotropic melt (clearing temperature) are generally specified, as determined calorimetrically or by means of a polarizing microscope. Furthermore, if different liquid crystalline states are present, the set of corresponding transition temperatures are specified. The appearance of mesophases is coupled with peculiarities in the molecular geometry. Spherical molecules cannot develop mesophases, but molecules whose shape can be characterized roughly as cylindrical or disc-shaped can do so. The molecules here can be rigid, and the ratio of their maximum to minimum dimensions (for example, cylinder length/cylinder diameter) must clearly exceed a critical value of approximately 3.

The structure of such mesophases is then characterized by the fact that in the simplest case of cylindrical molecules, in the so-called nematic phase, the molecular centers are distributed randomly as in an isotropic melt, while the long axes of the molecules are oriented parallel to one another. This differs from the condition in the isotropic melt, in which the molecular axes are distributed statistically. The consequences are anisotropic mechanical, electrical, and also optical properties. In the cholesteric phase, there is added a continuous helical variation of the direction of orientation of the long molecular axes as an additional ordering principle, which leads to special optical properties, such as strong optical activity or selective reflection. Finally, in the so-called smectic phases there is an additional regular arrangement of the centers of gravity of the molecules in space to supplement the orderly orientation already described that is characteristic for the nematic state, for example, along only one space axis, but in other smectic modifications also along two or even three axes independent of one another. Nevertheless, these phases are fluid. Disc-shaped molecules can develop so-called discotic phases in which either only the normals to the discs are oriented parallel to one another (as in the nematic phase) or in which the discs are arranged in a regular or irregular manner within columns. We speak of columnar structures in this case.

A characteristic parameter of liquid crystalline structures that is very important for application is the orientation ordering parameter, that is a measure of the quality of the orientation ordering. Its value is between 0 for complete disorientation (as in the isotropic melt), and 1 for perfect parallel orientation of all of the long molecular axes.

The wide distribution of liquid crystalline substances in industrial products such as display units in pocket calculators, wristwatches, or digital measuring instruments, results from the characteristic feature that the direction of orientation that can be represented by the so-called director can be changed easily by externally acting electrical, magnetic, or mechanical fields. The changes in the optical characteristics caused by these, in combination with other components such as polarizers, cellular walls, etc., can be used in display elements to display information. The cell walls here serve to protect the liquid mesophases and provide for the necessary macroscopic shape of the liquid crystal film.

It has been found in recent years that it can be beneficial for many areas of application to combine the properties of liquid crystalline phases with those of polymers. The beneficial polymer characteristics here are good mechanical properties, which makes it possible to produce thin, dimensionally stable films from such substances, and the occurrence of a freezing process (glass transition) which makes it possible to preserve a prescribed orientation structure. Specification of the glass temperature Tg, which can be determined calorimetrically, for example, is used to characterize the range of existence of the solid liquid crystalline phase. Above this temperature, the polymer exhibits a viscoelastic state.

Theories on the development of liquid crystalline phases in general and on the development of such phases in polymer systems in particular, as well as experimental findings, shown that the path to the liquid crystalline polymer leads through the use of rigid mesogenic structural units, such as those characteristic of low molecular weight liquid crystals, in combination with flexible spacer groups and flexible chain molecules. Very diverse structures are possible here. The mesogenic groups in the class of sidechain liquid crystals are fastened to a flexible or semiflexible main chain through a flexible spacer, or optionally without this spacer. The mesogenic groups in this case can be cylindrical or disc-shaped. The main chain can also contain mesogenic groups that are separated by flexible units. Copolymers characterized by the fact that different spacers and/or mesogenic groups occur in a polymer can also develop liquid crystalline phases.

Besides these sidechain liquid crystals, main chain polymers also show liquid crystalline phases under certain conditions. The conditions for this are that the chains are either completely made up of rigid groups or of rigid and flexible groups. Copolymers of various mesogenic groups and/or spacer groups can likewise develop liquid crystalline phases. The mesogenic groups can have either a cylindrical shape or the shape of a rod. The nature of the mesophases and the ranges of existence of these phases and of the glassy state can be adjusted approximately through the structure of the mesogenic groups, through the spacer length and flexibility, the flexibility of the main chain, and through its tacticity and length.

Up to now, almost exclusively main chain polymers with exclusively rigid units or with predominantly rigid units have been introduced into the market. They have extremely high values of strength and rigidity. We speak of self-reinforcing thermoplastics. Their fields of use are technical sectors in which extreme mechanical properties are required. (See Kirk-Othmer, Encyclopedia Chemical Technology, 3rd Ed. Vol. 14, pp. 414–421, (1981); J. H. Wendorff, Kunststoffe 73, 524–528 (1983); M. G. Dobb, J. E. McIntyre, Adv. Polym. Sci. 60/61, 61–90 (1984).

Polymers with flexible and rigid units have not yet found use in systems introduced to the market. Their advantage consists of a value of the orientation ordering parameter that is high in comparison with sidechain liquid crystals (See C. Noel, F. Laupretre, C. Friedrich, B. Fagolle, L. Bosio, Polymer 25, 808–814 (1984); B. Wunderlich, I. Grebowicz, Adv. Polymer. Sci. 60/61, 1–60 (1984), Kirk-Othmer, Encyclopedia of Chemical Technology, 3rd Ed., Vol. 14, pp. 414–421 (1981). The polymers with mesogenic side groups have also been given much attention most recently (See S. B. Clough, A. Blumstein & E. C. Hsu, Macromolecules 9, 123 (1976); V. N. Tsekov et al, Europ. Polymer I. 9,481 (1973); L. Strzelecky & L. Libert, Bull. Soc. Chim. France 297 (1973); H. Finkelmann in "Polymer Liquid Crystals", Academic Press, 1982; J. Frenzel, G. Rehage, Macromol. Chem. 814, 1689–1703 (1983); Macromol. Chem. Rapid Commun. 1, 129 (1980); D. Hoppner, J. H. Wendorff, Die Angewandte Makromolekulare Chemie 125, 37–51 (1984), DE-A 27 22 589, DE-A 28 31 909, DE-A 30 20 645, DE-A 30 27 757, DE-A 32 11 400; EU-A 90 282.

U.S. 4,293,435 discloses a technical use of the specific behavior of liquid crystalline polymers that is associated with the transition into the glassy state. In this case, information is stored by the application of conditions that change the arrangement and orientation of the liquid crystalline polymers in a definite manner (for example, electrical and magnetic field or pressure). This state of the art is discussed in British Pat. No. 2,146,787. It is pointed out that the storage of the device provided for in U.S. Pat. No. 4,293,435 in the solid state below the glass temperature (Tg) means that Tg is above ordinary room temperature (Ta), i.e., that the polymer system is used at temperatures that are of the order of magnitude of 100° C. above Ta if it is desired to record the information within a reasonable time. Such temperatures are said to be inconvenient and in the longer view would involve a degradation of the polymer. These difficulties can be avoided according to the British Patent if certain polymeric sidechain liquid crystals are used. It is then no longer necessary to keep the temperature below the Tg to store the device, but stable storage for many years should be possible with temperatures above Tg and below a temperature (Tf) at which the polymeric material begins to become fluid.

The determination of the Tf can be accomplished by following the transmission of light through a liquid crystalline polymer between two crossed polarizing filters with the temperature increasing from the glass temperature. Several degrees below the smectic-isotropic phase transition, the optical transmission suddenly increases. This increase originates from the transition of an anisotropic but almost opaque state to a highly birefringent, transparent state of the range. The temperature range above this temperature Tf is called the "fluid region". The optical transmission also increases with increasing temperature until it reaches a maximum at a temperature Tm. The Tm marks the point at which the isotropic (clear) phase first occurs.

Since the occurrence of the isotropic phase leads to extinction of the light with crossed polarizers, a further temperature increase brings about a decrease of the light transmission to the extent that the isotropic regions increase in size, until the so-called clearing temperature (Tc) is reached, at which the last residues of the structure responsible for the birefringence have disappeared.

British Pat. No. 2,146,787 claims a device with a material film that contains a liquid crystalline polymer with mesogenic sidechains, and devices for the thermal conversion of at least a portion of the material from the viscous state in which the temperature of the material is in the region of Tg to Tf, into the liquid range, and devices for controlling at least a portion of the material in the liquid region, by which a selective change in the texture of the molecules in the material is produced. Information is thereby input that is retained after the cooling of the liquid region and its return to the viscous state. It si thus an essential prerequisite for the British Patent to use polymer material for which it is true that Tf>Ta>Tg. A device is also described in which the material film contains a liquid crystalline polymer with a smectogenic sidechain. Polymeric liquid crystals of the polysiloxane type with diphenylcyano sidechains or benzoic acid ester sidechains are particularly preferred.

Now as ever, there is great interest in optical storage media that are capable of reversible storage in addition to high display densities. The methods described above for solving the problem of optical data storage represent relatively narrow, limited technical solutions. Thus, the device of British Pat. No. 2,146,787 depends on the use of liquid crystalline sidechain polymers with the essential prerequisite that the temperature is selected so that the polymeric material is kept in a viscous state region. The disclosure covers polysiloxane liquid crystals, preferably with diphenylcyano or benzoic acid ester sidechains. The stability of the stored information is not absolutely guaranteed because of the molecular mobility that is present and the finite relaxation times, and also because of the possibility of effects on the system of interfering fields, for example. Furthermore, technical methods that could be carried out without an excessively narrow latitude would be desirable.

The German Pat. applications P 36 03 266.2, P 36 03 267.0, and P 36 03 168.9 describe the storage of optical information in liquid crystalline main chain polymers and sidechain polymers. The entry of information here occurs through local heating in the isotropic phase or through reorientation of the molecules in the anisotropic phase. These writing processes require relatively high intensities of the writing laser.

SUMMARY OF THE INVENTION

Accordingly, one object of the present invention is to provide a device for reversible optical information storage which does not depend on the polymer material being in a viscous region.

Another object of the invention is to provide a device for reversible optical information storage which is reliable and not subject to the influence of spurious fields.

A further object of the invention is to provide a device for reversible optical information storage in which information can be repeatedly stored and read without decomposition of the device.

Still a further object of the invention is to provide a device for reversible optical information storage which utilizes polymeric liquid crystals which contain photochromic groups.

These and other objects which will become apparent from the following specification have been achieved by the device of the present invention which comprises:
(i) a substrate; and
(ii) a film in contact with the substrate, said film comprising a liquid crystalline polymer and a source of photochromic groups, in an oriented or disoriented state;
wherein the information is stored in said film by locally reorienting the state of said film, whereby said reorienting produces a local variation of the ordering of said polymer wherein the reorienting is induced by photoisomerization.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein.

DETAILED DESCRIPTION OF THE PREFERRED EMBODIMENTS

Figure 1:
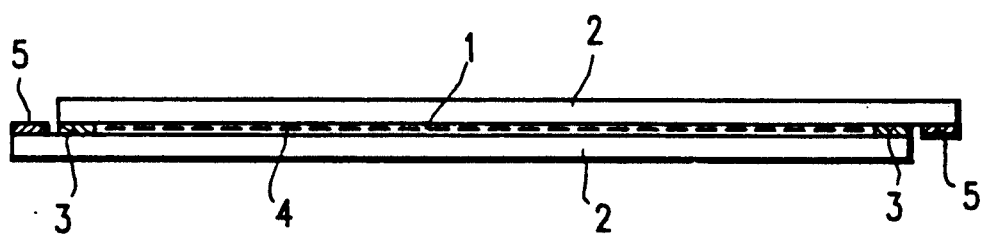
FIG. 1 illustrates the preferred embodiment of the device for reversible optical information storage in which a film of a polymeric liquid crystal is located between two substrate plates.

It has now been found that a particularly desirable form of optical data storage can be achieved by use of the device pursuant to the invention. The invention thus concerns a device for the reversible optical storage of information with a polymeric liquid crystalline storage medium, with the storage medium consisting of a macroscopically oriented film of a liquid crystalline polymer that contains photochromic groups, and with the information being stored by local disorientation of the molecules induced by photoisomerization by means of a selectively acting light source. The process of information storage occurs as follows in general:

The orientation order is destroyed through locally induced photoisomerization by means of a light source of suitable frequency, preferably a laser, and optical information is thus stored. The storage medium is preferably part of a device.

In comparison with information storage through local heating of the storage medium into the isotropic state, the device has the advantage of a very low writing intensity of the laser. The temperature of the storage medium at which the information is entered can be in the range of the spatially stable state below the glass temperature Tg of the liquid crystalline main chain polymer. Alternatively, the temperature of the storage medium at which the information is entered can also be in the viscoelastic state region above the glass temperature Tg of the liquid crystalline main chain polymer. The macroscopically isotropic area formed is frozen in below the glass temperature Tg. The scattering centers produced can be read as optical information.

The requirements for the structure of the liquid crystalline polymers for the various orientation processes are documented in the literature. Thus, for example, a homeotropic orientation in the electrical field requires a positive anisotropy of the dielectric strength for the frequency range used. Homogeneous orientation, on the other hand, can frequently be produced by localizing surfaces of structured polyimide. Mesogenic groups with an anisotropic form are necessary for this. See R. Kelker, R. Hatz, Handbook of Crystal, Verlag Chemie 1981, Pranoto, W. Haase, Mol. Cryst. Liq. Cryst. 98, 299–308 (1983); R. Zentel, R. Ringsdorf, Macromol. Chem. 182, 1245–1256 (1982); Liquid Crystals and Ordered Fluids, A. Griffin, J. F. Johnsen, Vol. 4, Plenum Press, New York 1984.

A prerequisite for the functional capability of the storage medium within the meaning of this invention is the presence of at least one type of photochromic group in the storage medium. This prerequisite can be met on the one hand by incorporating monomers containing such photochromic groups in the polymer structure of the liquid crystalline polymers, and/or by adding compounds that have photochromic groups, preferably of the low molecular weight type, to the liquid crystalline polymer.

The monomers containing photochromic groups can represent either the only monomeric species, or they can be components as comonomers of the liquid crystalline polymers described in detail below, together with other monomers.

Photochromic groups that are suitable for use pursuant to the invention that may be mentioned are those of the following structures corresponding to azobenzene, azoxybenzene, and stilbene:

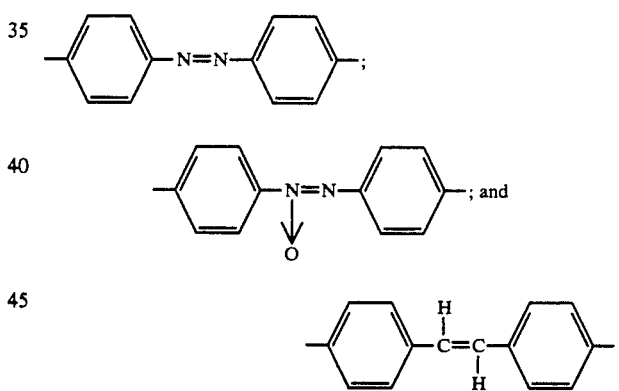

which are called "structural unit M°" below. To the extend that they are monomers, they also contain the usual units participating in polymerization or polycondensation processes, in addition to the structural units M° mentioned above.

The monomers that have photochromic groups can thus be derived from the compounds of Formula I, IV, or VI described below, or from the polysiloxane group (see "Liquid Crystalline Polymers" below), by replacing M or M', or M" in these formulas by the structural units M°.

These monomers are also treated pursuant to the invention similarly to those described below, for example, with respect to polymerization.

As mentioned previously, the photochromic groups can also be components of compounds of the low molecular weight type. These preferably also contain the M° groups, with the two phenyl groups generally being substituted with "inert" groups, for example with alkoxy or alkyl groups, generally with 1 to 20 carbon atoms, preferably 6-18 carbon atoms. For example, the following compound might be mentioned:

$$C_8H_{17}O-\phenyl-N=N(\rightarrow O)-\phenyl-OC_8H_{17}$$

The liquid crystalline polymers of the present invention may be liquid crystalline main chain polymers or liquid crystalline side chain polymers. The preferred liquid crystalline polymers are disclosed in copending U.S. application Ser. Nos. 07/010,488 filed Feb. 3, 1987 now abandoned; 07/010,778, filed Feb. 3, 1987 now Pat. No. 4,837,745; and 07/010,546, filed Feb. 3, 1989. The disclosures of these applications are incorporated herein by reference for a more complete description of these preferred liquid crystalline polymers. It is to be understood that the structural unit M° may replace M,M' or M" in the formulas disclosed in these references.

THE LIQUID CRYSTALLINE POLYMERS

I. Liquid Crystalline Main Chain Polymers

The liquid crystalline main chain polymers FHP that can be used pursuant to the invention generally obey the principle that the chains are made up of relatively rigid, mesogenic groups and flexible spacer groups. The rigid and flexible groups generally alternate regularly along the chain. However, it may be beneficial in many cases to vary the structural principle so that spacer groups of different lengths or different mesogenic groups make up the chain, with the occurrence of these structural units occurring regularly or randomly along the chain. The linkage mechanism is generally that of condensation (polycondensation). Of particular interest are the following polycondensation products:

Polyester Type

A. The product of a diol (I) containing the mesogenic unit $$HO—m—OH \quad (I)$$

in which M represents the mesogenic unit, with an aliphatic dicarboxylic acid $$HOOC—(CH_2)_n—COOH \quad (II)$$

in which n stands for a number from 2 to 20, as spacer. The mesogenic units M refer back essentially to the free low molecular weight mesogens of the state of the art.

Preferably, the mesogenic units M contain phenyl groups that are joined to one another directly or through a bridge, in accordance with the following formula (III)

$$\text{-}(CH_2)O]_{\overline{m}}\text{-}\phenyl\text{-}(L)_m\text{-}\phenyl\text{-}O\text{-}[(CH_2)]_{\overline{m'}} \quad (III)$$

in which L stands for the groups —CH=N—;

$$-CH=\overset{O}{\overset{\uparrow}{N}}-;$$

$$-C\equiv C-;$$

$$-O\overset{O}{\underset{\parallel}{C}}-; \quad -HC=C-; \quad -CH=N-N=CH- \\ \phantom{-O\overset{O}{\underset{\parallel}{C}}-;} \phantom{-H}CH_3 \phantom{=C-;} CH_3 \phantom{=N-N=} CH_3$$

or for a phenylene group and m and m' stand for 0 or 1, and optionally one or both of the phenyl groups can be multiply substituted symmetrically with methyl groups or a halogen such as chlorine, bromine, etc.

B. The product of a dicarboxylic acid (IV) containing the mesogenic unit $$HOOC—M'—COOH \quad (IV)$$

in which M' has the same meaning as M in Formula (II), provided that m' generally stands for 0, with an aliphatic diol of the formula (V)

$$OH—A—OH \quad (V)$$

in which A stands for an alkyl chain with 2 to 20 chain members, optionally substituted with C1-C2 alkyl groups, optionally interrupted by one or more ether oxygen atoms.

C. The product of a diisocyanate (VI) containing the mesogenic unit $$O=C=N—M''-N=C=O \quad (VI)$$

in which M" has the same meaning as M in Formula I, preferably $$CH_3\text{-}\phenyl\text{-}\phenyl\text{-}CH_3$$

with the aliphatic diol of the formula (V).

D. The product of a bisphenol derivative of the formula (VII)

$$HO-\phenyl-O-(CH_2)_p-O-\phenyl-OH \quad (VII)$$

in which p stands for a number from 2 to 20, preferably from 2 to 12, or of an optionally substituted hydroquinone (VIII)

$$HO-\phenyl(R')-OH \quad (VIII)$$

in which R' stands for methyl, phenyl, chlorine, or bromine, or of a phenyl compound or of a diol of Formula I, especially when m and m' stand for 0, or of a compound

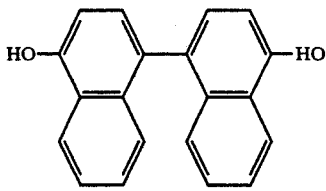

with terephthalic acid or a diphenyldicarboxylic acid of the formula (X)

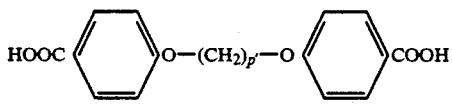

when p' stands for a number from 2 to 20, preferably 2 to 12.

E. The product of a dianiline of the formula (XI)

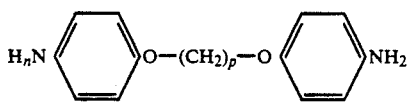

in which p has the meaning given above, with terephthalaldehyde, to form a Schiff base. Besides the chemical structures already mentioned explicitly, the following types of structures also lead to the development of liquid crystalline phases.

Polyesteramide Type

A polyesteramide example is the structure (XII)

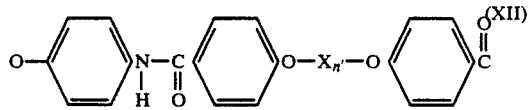

in which $X_{n'}$ stands for flexible spacer units of length n' (n'=2 to 20).

Polysiloxane Type

A polysiloxane example is the structure of Formula (XIII)

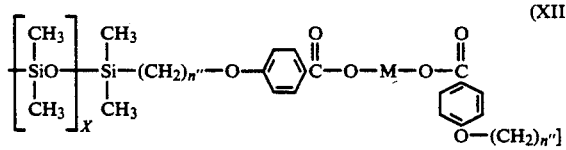

in which M stands for a mesogenic group and n'' stands for a number similar to n, and X means the number of siloxane units (generally X=2-38), as well as polymers that are made up of disc-shaped mesogenic groups and flexible groups. (See I. Watanabe, W. R. Krigbaum, J. Polym. Sci., Polym. Phys. Ed. 23, 565-574 (1985); A. Blumstein, Polym. J. 17, 277-288 (1985); S. B. Clough, A. Blumstein, E. C. Hso, Macromolecules 9, 123-127 (1976); C. Noel, F. L. Laupetre, C. Friedrich. B. Fayolle, L. Bosio, Polymer 25, 808-814 (1984); R. W. Lenz, Polym. J. 17, 105-155 (1985).

The polycondensation is carried out in a known manner. In the esterification reactions of Types A. and B., acidic or basic catalysts can be used to adjust the ester equilibrium, as for example by strong acids (p-toluenesulfonic acid), metal oxides, alkali metal or alkaline earth salts of weak acids or alkoxides. The polymerization can optionally also be carried out in the melt.

The molecular weights of polycondensates are generally in the range of 1000 to 20,000.

The glass temperature (Tg) of the liquid crystalline polymer used pursuant to the invention is generally in the range between −40° C. and 110° C. (Concerning the glass temperature Tg, see I. Brandrup and E. H. Immergut, Polymer Handbook, 2nd Ed. III—139, J. Wiley, 1975).

II. Liquid Crystalline Sidechain Polymers

Polymeric liquid crystals PFK usable pursuant to the invention consist entirely or partly of repetitive units that can be shown schematically by the general formula XIV

in which D-E stands for the elements of the main chain of the polymer, X stands for a spacing unit ("spacer"), and Y stands for a mesogenic side group.

The mesogenic side groups are responsible for the resulting liquid crystal character. Sidechains of the smectogenic type are of particular interest.

The elements D-E preferably correspond to units D'=E' polymerizable by a radical mechanism (corresponding monomer: D'=E'−X−Y).

The units D-E are preferably vinyl groups such as those present in vinyl compounds polymerizable by a radical mechanism, for example units

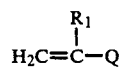

in which $R_1$ stands for hydrogen or methyl and Q stands for a function that activates the double bond, such as the group

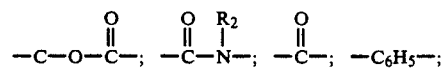

in which $R_2$ is hydrogen or alkyl with 1 to 6 carbon atoms.

The spacer group X represents a flexible chain with 1-14 chain units, preferably an alkylene group —(CH$_2$-)$_n$—in which n is 1 to 14, in which individual chain units can optionally be substituted, for example by halogen such as chlorine, or can be replaced by an ether bridge.

The mesogenic sidechain Y optionally contains a function VF linking the spacer group X with the actual mesogenic group M, as for example an —O—;

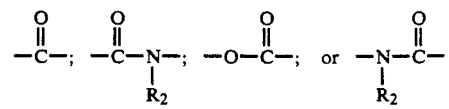

group, in which $R_2$ has the meaning described above. A list of suitable mesogenic groups for M and Y is found in Kelker and Hatz, Handbook of Liquid Crystals, Verlag Chemie 1980, pp. 67-113.

Preferably bonded through the linking function VF is a mesogenic group M containing aromatic groups, for example, which can preferably be represented by the formula XV

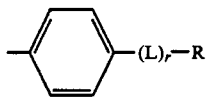 (XV)

in which L stands for a bridge consisting of the groups

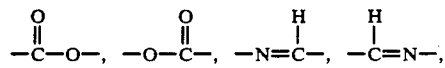

—CH=CH—
or for a group

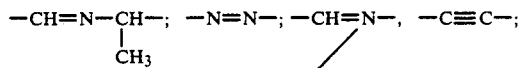

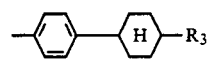

m is 0 or 1, and R is a

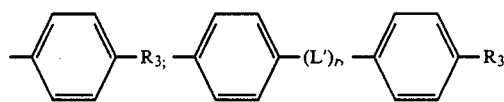

group, or if r is 0, R also stands for a

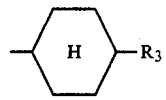

group and L' and r' have the same meanings as L and m, and in which $R_3$ is hydrogen, $(O)_s$—$(CH_2)_{t'}$H, —CN, or halogen, especially fluorine, chlorine, or bromine, and t and t' stand for a number from 1 to 8, especially 1 to 6, and S is 0 or 1.

Polymers of the formula XIV can be mentioned in particular, in which M stands for the following mesogenic groups:

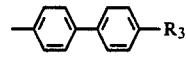 (Formula XIV A)

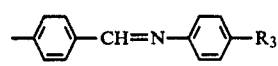 (Formula XIV B)

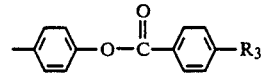 (Formula XIV C)

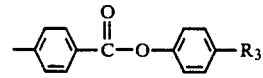 (Formula XIV D)

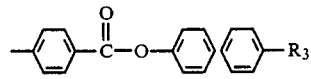 (Formula XIV E)

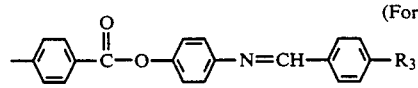 (Formula XIV F)

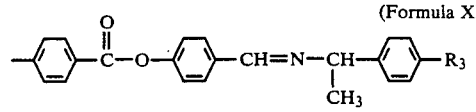 (Formula XIV G)

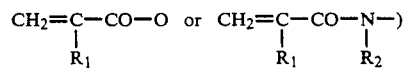 (Formula XIV H)

Derivatives of (meth)acrylic acid are also preferred. D'=E' in this case stands for $$CH_2=C-CO-O \quad \text{or} \quad CH_2=C-CO-N-)$$
$$\quad\quad\quad |\quad\quad\quad\quad\quad\quad\quad\quad |\quad\quad\quad |$$
$$\quad\quad\quad R_1\quad\quad\quad\quad\quad\quad\quad R_1\quad\quad R_2$$

and derivatives in which the spacer X represents a $(CH_2)_n$ group with n=1-14. The polymeric liquid crystals usable pursuant to the invention can also be the product of a polycondensation. Polyesters of formula XVI might be mentioned in particular $$[T—OOC—CH_2—COO] \quad\quad (XVI)$$

in which T stands for a linear alkyl group (derived from the diol HO—T—OH) or an aryl, especially a phenyl, group alkylated in the para position (See for example: B. Reck, H. Ringsdorf in Makromol. Chem. Rapid Commun. 6, 291-299 (1985). A polymer that contains a

group as the mesogenic group M and a —$(CH_2)_6$— group as the spacer X is of particular interest. Examples of the group T that might be mentioned are the groups—

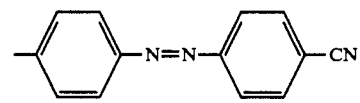

In general, the molecular weight of the polymeric liquid crystal PFK is in the range $\overline{M}w=10^3$ to $10^5$, generally in the range of 5000 to 200,000, and preferably approximately 100,000 (determination by gel permeation chromatography). The viscosities in the isotropic phase, as a reference value, are in the range of $10^4$ poise.

The glass temperature (Tg) of the liquid crystalline polymers used pursuant to the invention is generally in the range of −40 to 110° C., particularly in the range from −10 to 80° C. (Concerning the glass temperature Tg: See I. Brandrup and E. H. Immergut, Polymer Handbook 2nd Ed. III—139, J. Wiley, 1975).

In the case of liquid crystalline main chain polymers also, the previously mentioned photochromic groups with the structural unit M° are preferably used. They are located in the side group of the monomers. These can be used as comonomers, as the only mesogenic groups, or the photochromic groups can be used as low molecular weight components in the form of admixtures.

THE DEVICE

The liquid crystalline polymer proposed for the information storage process must be matched in its absorption behavior to the wavelength of the writing laser. For example, this can be done either by admixing a suitable dye or photochromic group or by intrapolymerizing it in the polymer chain. The group itself can have a mesogenic character. Preferably, a polymeric liquid crystal can be used whose mesogenic groups themselves absorb in the required wavelength region, which therefore corresponds to the extreme case of a 100% intrapolymerized mesogenic photochromic substance or dye. The necessary extinction of the storage medium is adjusted by the concentration.

Suitable dyes are known from the literature. Suitable dyes for mixing into the liquid crystalline phase that are mentioned in the literature are those that satisfy a number of conditions. (See, for example, J. Constant et al., K. Phy. D: Appl. Phys. Vol. 11, pp. 479 ff (1978). Suitable photochromic groups are known from the literature (See Ch. Leier, G. Petzl, J. Prakt. Chem. 321, 197 (1979); J. L. R. Williams, R. C. Daly Prog. Polym. Sci. Vol. 5, 61–93, pp. 73 ff (1977), or they can be prepared by known procedures or in analogy to procedures that are themselves known.

The polymer can be used in the form of a thin film or of a laminate, as a coating of a solid or flexible matrix film. The thickness of the polymer film is preferably in the range of $10^{-3}$ to $10^{-6}$m. In the design shown in FIG. 1, the device of the present invention comprises a recording cell (1) consisting of two transparent plates (2) in plane-parallel arrangement, preferably glass plates with a suitable separation, generally below 1 mm, preferably approx. 10 $\mu$m. The base area is several cm² to dm². The two inner surfaces of the glass plates (2) were conductively sputtered with $InO_2/SnO_2$ and conductive contact was made to the outside. The glass plates (2) prepared in this way were fastened to one another by means of a thermally stable adhesive, for example a silicone adhesive, so that a cell-like inner space is formed with only one inlet and one outlet several mm wide.

The desired separation of the two glass plates (2) is set permanently by two suitable spacers (3) of the appropriate dimension, preferably made of polyimide plastic. The recording cell also has electrodes (4). After the adhesive dries, the cell is filled on a device that can be heated with the liquid crystalline polymer in the isotropic state, preferably of Formula I. The cell space that is still open is filled with the polymer melt by capillary action.

The advantage of this procedure over the use of a still partially open cell, among others, lies in the fact that the inclusion of air bubbles is reliably prevented.

Furthermore, standardized cell blanks with variable geometry (outside dimensions, spacing) can be produced in this way at low cost, which can then be filled as needed in a second step in the manner described with the corresponding liquid crystalline polymer. The orientation is carried out in a known way by applying an oriented field (alignment field), particularly a magnetic field and specifically an electrical field, or by surface effects. The necessary orientation can just as well be produced by suitable shear or stretching. In the case of the preferred use of the electric field, an alternating voltage is applied to the recording cell (1) filled in this way at temperatures above Tg, and the device is cooled to room temperature while retaining the applied voltage. An oriented liquid crystal film is the result.

The glass temperature Tg of the liquid crystalline polymer is above room temperature Ta. A temperature of 20° C. might be assumed as room temperature. The information can be read by illuminating the polymer film with monochromatic coherent light. For reading in the information, there are various possible orientations of the liquid crystalline polymer film in the device pursuant to the invention:

1) The mesogenic groups are uniformly oriented parallel to the normal to the surface of the polymeric film. This can be accomplished by applying an electrical alternating field to the plates (2) coated with transparent electrodes, with the electrical field being parallel to the normal to the polymeric film, by applying a magnetic field, or by surface treatment.

2) The mesogenic groups are oriented parallel or tilted from the plane of the film and parallel to a macroscopically defined direction. This can be accomplished either by coating the plates (2) with a suitable material such as polyimide and by structuring this coating along the desired preferred orientation or by suitable slanted sputtering of the substrate with silicon oxide. The necessary orientation can likewise be produced by suitable shear or stretching. In both cases 1) and 2), the orientation occurs in the liquid crystalline state.

The orientation is frozen by cooling to the glassy state. The recording cell (1) prepared as described above constitutes the actual storage medium for the entry of optical information. The process is based generally on the local, selective variation of the state of order of the polymeric liquid crystal molecules in a storage medium containing them.

The liquid crystal film contained in the storage medium can be present in macroscopically oriented or disoriented form. The state of order can be varied by local electrical, magnetic, or surface active fields. The storage medium can be heated locally or overall by the heat source. If the heat source exerts a local selective effect, the variation of the state of order can be induced by an electrical, magnetic, or surface-active field acting over the entire dimension of the storage medium. Particularly preferred applications are based on the scattering center effect and the nonlinear optical effect (optically induced Frederiks transition).

PROCESS OF INFORMATION STORAGE

Scattering Center Method

The entry of information consists in principle of the production of scattering centers by means of a focused laser beam that produces a local disorientation in the oriented liquid crystalline polymer film. The locally formed macroscopic isotropic region is frozen below the glass temperature or remains above Tg in the viscoelastic temperature range. A preferred procedure is the following: A disorientation is produced according to the invention in the film formed from the liquid crystalline polymer by a locally induced photoisomerization at the interference maxima of an interferometrically produced lattice. A laser beam is used, for example light from an argon laser with a wavelength of 514.5 nm. A focused laser beam is also used, with the laser beam and the storage medium being moved in a definite way relative to one another.

Turning off the laser beam and subsequent cooling lead to the stable disoriented (macroscopically isotropic) ranges. The scattering centers produced in this way can be read as optical information. The reading process takes place similarly with a different laser beam of suitable wavelength and intensity, so that the stored information is not disturbed. The absorption behavior of the storage medium is preferably chosen so that the information can be entered with a laser beam of suitable wavelength and intensity and can be read with a different laser beam of another wavelength without disturbing the information. The experimental arrangement for evaluating the storage characteristics of the described recording cell is based on a Mach-Zehnder interferometer (See Encyclopedia of Natural Science and Technology, Vol. 2, Verlag Moderne Industrie, 1980). Sinusoidal intensity gratings with line separations between 100 $\mu$m and 1.0 $\mu$m can be produced with this to superimpose two linearly polarized planar component waves. The intensity distribution analogous to a Fresnel zone plate can be realized by superimposing a planar wave with a spherical wave in combination with a convex lens.

Erasing the Stored Information

Fundamentally, the stored information can be erased by increasing the temperature (above $T_{NI}$) and cooling in the electrical or magnetic field. Stored information can be erased locally by increasing the temperature and then cooling in the electrical or magnetic field while restoring the original state of orientation in the local region. Alternatively, all of the entered information can be erased and the original state can be restored by increasing the temperature of the storage medium and cooling it in the electrical or magnetic field. The procedure is preferably as follows: Similarly to the preparation for the first entry process, the information stored in the liquid crystalline polymer is erased by heating the recording cell (1) above Tg and then cooling it with applied alternating voltage (suggested values 500 V, $\nu = 1$ Khz). After the entry and erasing processes had been repeated a number of times, it was found that no irreversible changes of the recording cell occur while any of the steps are being carried out.

Reversible Analog Data Storage

As stated previously, the use of the nonlinear optical effect provides the possibility of storing analog data by an optical method, reading them optically, and when necessary erasing them again and entering new data. The data are stored by holographic methods in the storage medium of the invention. The information to be stored generally involves depictable physical structures such as objects like printed pages or graphic formations. For this purpose, the structure to be stored is illuminated by a coherent, monochromatic light source. The interference pattern that is determined by the direction, amplitude, and phase of the light scattered by the structure to be stored relative to a reference light wave originating from the same light source, is recorded and stored holographically in the film of liquid crystalline polymer, which is preferably macroscopically oriented.

The thickness of the liquid crystalline polymer film in this case is preferably between 1 and 20 $\mu$m. The plane-parallel, transparent plates can be made of transparent plastics such as PMMA, or preferably of inorganic glasses.

Preferably, dyes are present in the storage medium. The dye molecules can be components of the liquid crystalline polymer or they can be admixed into the storage medium and distributed in it. The glass temperature Tg of the liquid crystalline polymer is above room temperature Tg. The information can be read by illuminating the polymer film with monochromatic coherent light. To store the information, there are various possible orientations of the liquid crystalline polymer film in the device of the invention (See FIG. 1).

1. The mesogenic groups are uniformly oriented parallel to the normal to the polymeric film. This can be accomplished by applying an electrical alternating field to the plates (2) coated with transparent electrodes, with the electrical field being parallel to the normal to the polymeric film, by applying a magnetic field, or by surface treatment.

2) The mesogenic groups are oriented parallel or tilted from the plane of the film and parallel to a macroscopically prescribed direction. This can be accomplished either by coating the plates (2) with a suitable material such as polyimide and by structuring this coating along the desired preferred orientation, or by suitable slanted sputtering of the substrate with silicon oxide.

The necessary orientation can also by produced by suitable shear or stretching.

In both cases (1) and (2), the orientation is carried out in the liquid crystalline state.

The orientation is frozen in by cooling to the glassy state. The storage is accomplished in the manner described above, using as the monochromatic light source a laser whose wavelength is in the absorption region of the storage medium. Reading is done by means of a laser whose wavelength is absorbed to a much smaller extend by the storage medium. The entry and reading can be done on the solid film at room temperature. The information is erased by heating the sample in the anisotropic or isotropic range above the glass temperature Tg.

Reversible Digital Data Storage

Another embodiment of the invention concerns the digital storage of data by optical means, with the optical reading, erasing, and reentry of information being provided for in this case also. A digital phase structure is produced in the optically clear, preoriented liquid crystalline polymer film of the storage medium by means of a monochromatic laser beam. The laser beam and storage medium are moved relative to one another in a definite manner and the intensity of the laser beam is modulated. The stored information is read by defined relative motion of the storage medium and a laser beam of constant intensity and suitable wavelength, that does not affect the stored information.

The storage medium is prepared technically (orientation of the polymer) similarly to the reversible analog data storage. The storage occurs in the manner described above, using as the monochromatic light source a laser whose wavelength is in the absorption region of the storage medium. Reading is done by means of a laser whose wavelength is absorbed by the storage medium used to a much smaller extent. The storage and reading can be done on the solid film at room temperature. The information is erased by heating the sample into the anisotropic or isotropic region above the glass temperature Tg.

REVERSIBLE SYNTHETIC HOLOGRAPHY

A phase structure is produced in a preoriented liquid crystal synthetic film in the manner described above for reversible digital data storage by a digital method, by defined relative motion of the beam and the storage medium. The reproduction is then not carried out as in the case of the digital memory, by defined relative motion of the laser beam and storage medium, but by complete illumination of the synthetic hologram with a reference wave. The necessary information for determining the required intensity modulation must be computed in advance. The described process permits the production of phase structures with definite optical characteristics, such as lenses and the like. Since this occurs computationally in digital form, complicated processing steps (grinding of glass, polishing) can be substantially simplified. The low weight of the optical components produced in this way (eyeglasses, lenses) is also very important.

EXPERIMENTAL METHOD

The recording cell (1) described in FIG. 1 is used as the device. A polymer of the repeating unit

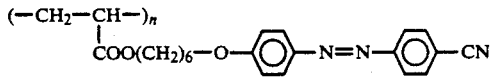

with a molecular weight of approximately $7 \times 10^3$. and a film thickness of approximately 10 μm is used as the storage medium. The transparent plates (2) in plane-parallel arrangement consist of glass coated with polyimide.

The recording cell prepared in this way is placed in a heating block transparent on both sides and heated to a temperature of approximately 10° below $T_{LC-I}$ i.e., the temperature of the transition from the liquid crystalline state to the isotropic phase.

Focused laser light from an argon laser (1 watt) with a wavelength of 514.5 nm is then used for illumination (50 mW focused on 10 μm). The polymer is thereby converted locally into the isotropic phase. The temperature reached locally definitely must not exceed the clarification temperature of the surrounding LC matrix, since a severe lowering of the clarification temperature can be produced by local rearrangement processes.

Figure 2A:
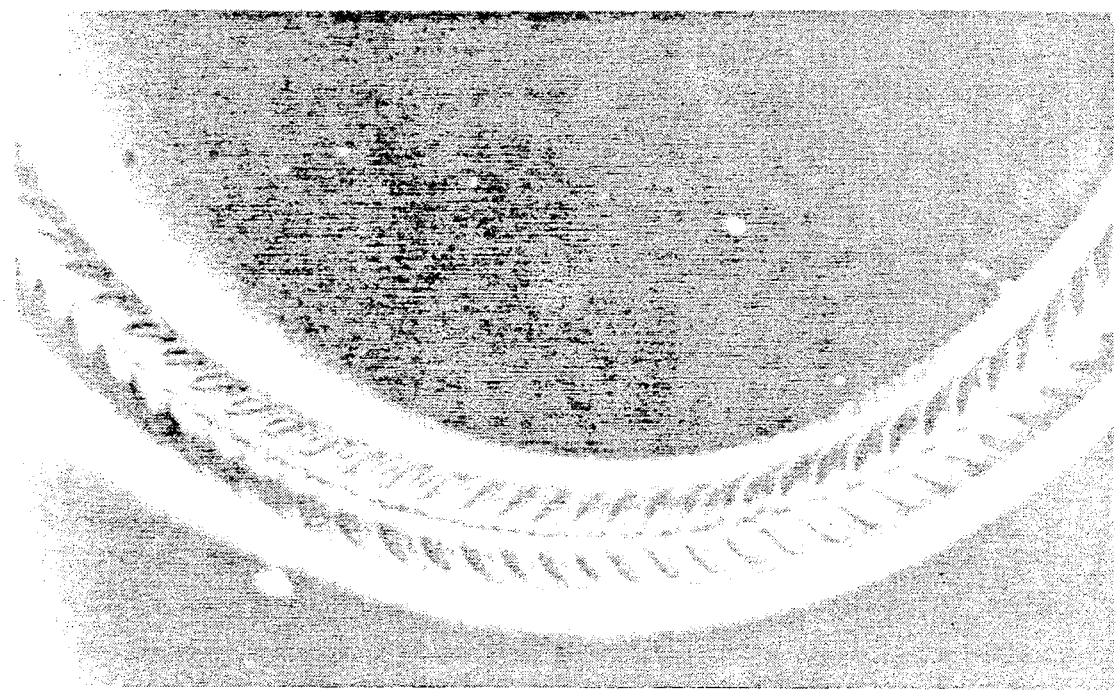
FIG. 2 shows a polarizing microscope photograph of a curved laser track with a diameter of 10 microns using the recording cell of the present invention.
Figure 2B:

After turning off the laser beam, the local disorientation is frozen in the glassy state. Because of this, the information entered is present as a scattering center in the transparent matrix. FIG. 2 shows a polarizing microscope photograph of a curved laser track with a diameter of 10 μm.

Erasing is done by local heating of limited regions, or alternatively of the entire recording film, to temperatures between the glass temperature Tg and the clarification temperature $T_{LC-I}$. 5° C. below $T_{NI}$ can be stated as a reference point. This restores the macroscopic orientation.

PREPARATION OF HOMOPOLYMERS OF THE MONOMERS:

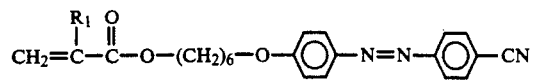

Approximately 3 g of monomer is dissolved in 10 ml of 1,4-dioxane in a Schlenk flask and is treated with 1 mole-% of azobis-(2,4-dimethylvaleronitrile) based on the monomer. The monomer solution is degassed by repeated evacuation and flushing with helium and polymerized in a thermostatic bath at 70° C. The polymers formed are precipitated with cold ether, dissolved in methylene chloride, and precipitated in methanol.

This process is repeated until no further monomer can be detected in the thin layer chromatogram. The purified polymer id dried under oil pump vacuum at 30–40° C.

The yields of polymethacrylates are 37–74% of the theoretical amount. In the comparable polymerization of acrylates, yields of approximately 15% are obtained.

The yield of polyacrylate was improved to 37% by adding three subsequent additions of 1 mole-% of initiator (every 2 hours).

| $R_1$ | Yield (%) | Mw | $T_{LC-I}$ |
|---|---|---|---|
| H | 15 | 4,430 | 125° C.[2] |
| H | 15 | 6,430 | 139° C.[1] |
| H | 37 | 6,990 | 139° C.[1] |
| $CH_3$ | 47 | 45,000 | 163° C.[2] |
| *$CH_3$ | 57–74 | 7050–50,000 | 160–130° C.[2] |
| $CH_3$ | 37 | 19,400 | 162° C.[2] |

[1] Determination: thermooptical analysis; values have uncertainties
[2] Determination: differential scanning calorimetry at the peak maximum.
*Chain regulated batches Obviously, numerous and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A method of reversible optical information storage using a device comprising (i) a substrate, and (ii) a film in an oriented or disoriented state in contact with said substrate, said film comprising a liquid crystalline polymer and photopolymerizable azo, azoxy or carbon-carbon double bond-containing photochromic groups capable of reversible light-induced isomerization, wherein said photochromic groups are contained in the monomers in said liquid crystalline polymer or are present in low molecular weight compounds added to said polymer, comprising the steps of:
   (a) writing information in said device by locally reorienting said film by photoisomerizing said photochromic groups in said film, film is in the shape-stable state below the glass temperature of said polymer when the information is; and
   (b) reading said stored information by illuminating said film with coherent monochromic light, wherein said film is in the shape-stable state below the glass transition temperature of said polymer during said writing and reading steps.

2. The method of claim 1, further comprising erasing the stored information by locally heating said film; and cooling said film in an electric, magnetic, or surface-active field, whereby the original oriented or disoriented state is restored.

3. The method of claim 1, further comprising erasing all of the stored information by heating said film; and
cooling said film in an electric, magnetic, or surface-active field, to restore the original oriented or disoriented state.

4. The method of claim 1, wherein said writing and reading steps are performed by a laser.

5. The method of claim 4, wherein the written information is fixed in the glassy state of said liquid crystalline polymer by turning off said laser.

6. The method of claim 4, wherein said writing step is performed by illuminating said film with a laser beam of suitable wavelength and suitable intensity, and said reading step is performed by a second laser beam having a different wavelength, whereby the stored information is not disturbed.

7. The method of claim 4, wherein said writing step is performed by illuminating said film with an interference pattern, wherein said interference pattern is generated by illuminating a depictable physical structure with a source of coherent monochromatic light, wherein said interference pattern is determined by the direction, amplitude and phase of the light scattered by said structure relative to a reference lightwave originating from the same light source.

8. The method of claim 7, wherein said reading step is performed by illuminating said reoriented film with monochromatic coherent light.

9. The method of claim 7, wherein a digital phase structure is produced in said film.

10. The method of claim 9, wherein said laser beam and said film are moved relative to one another in a definite manner during said writing and reading steps.

11. The method of claim 10, wherein the intensity of said laser beam is modulated during said writing step.

12. The process of claim 11, wherein said reading step comprises illuminating said digital phase structure with said reference lightwave.

13. The method of claim 12, wherein the pattern of said modulation is determined by computation.

14. The method of claim 4, wherein said writing step produces an information density expressed in lines per unit length having a maximum of 2,000 lines per mm.

15. The method of claim 1, wherein said information is optical signal processing information, Fourier transformation and convolution information, imaging system information, holographic information or coherent optical correlation information.

16. The method of claim 1, wherein said photochromic group contains a $C_{1-20}$ alkyl or $C_{1-20}$ alkoxy substituted azobenzene, azoxybenzene or stilbene group.

* * * * *